US008214694B1

(12) United States Patent
McKechnie et al.

(10) Patent No.: US 8,214,694 B1
(45) Date of Patent: Jul. 3, 2012

(54) LIGHTWEIGHT PROBE AND DATA COLLECTION WITHIN AN INTEGRATED CIRCUIT

(75) Inventors: Paul E. McKechnie, Midlothian (GB); Nathan A. Lindop, Musselburgh (GB)

(73) Assignee: Xilinx, Inc., San Jose, CA (US)

( * ) Notice: Subject to any disclaimer, the term of this patent is extended or adjusted under 35 U.S.C. 154(b) by 246 days.

(21) Appl. No.: 12/381,636

(22) Filed: Mar. 12, 2009

(51) Int. Cl.
*G06F 11/00* (2006.01)

(52) U.S. Cl. ............. 714/39; 714/37; 714/43; 714/724; 710/1; 326/16

(58) Field of Classification Search ................... None
See application file for complete search history.

(56) References Cited

U.S. PATENT DOCUMENTS

| | | | | |
|---|---|---|---|---|
| 5,675,729 A | * | 10/1997 | Mehring ................... | 714/37 |
| 6,182,247 B1 | * | 1/2001 | Herrmann et al. .......... | 714/39 |
| 6,389,558 B1 | * | 5/2002 | Herrmann et al. .......... | 714/39 |
| 6,581,191 B1 | * | 6/2003 | Schubert et al. ............ | 716/136 |
| 6,598,177 B1 | * | 7/2003 | Jones et al. ................ | 714/30 |
| 6,704,889 B2 | * | 3/2004 | Veenstra et al. ............ | 714/39 |
| 6,760,898 B1 | * | 7/2004 | Sanchez et al. ............. | 716/111 |
| 6,826,717 B1 | * | 11/2004 | Draper et al. .............. | 714/39 |
| 6,889,344 B2 | * | 5/2005 | Williams ................... | 714/43 |
| 7,209,849 B1 | * | 4/2007 | Watanabe et al. .......... | 702/108 |
| 2002/0147940 A1 | * | 10/2002 | Smith et al. ............... | 714/31 |
| 2005/0149604 A1 | * | 7/2005 | Navada ..................... | 709/200 |

OTHER PUBLICATIONS

'Using ChipScope Pro to Debug Endpoint Block Plus Wrapper, Endpoint, and Endpoint PIPE Designs for PCI Express' by Wiltgen et al, Xilinx Application Note, Oct. 22, 2007.*
'Online monitoring of FPGA-based co-processing engines embedded in dependable workstations' by Nikolaos Bartzoudis and Klaus McDonald-Maier, IEEE 2007.*
'Data flow must be 'seen' in router debug' Design Article by Scott Ferguson, EE Times, May 9, 2003.*
Vermeulen et al., "Communication-centric SoC Debug using Transactions", Proceeding of the 12th European Test Symposium, 2007, 6 pages.
Goossens, et al., "Transaction-Based Communication-Centric Debug", Proceedings of the First International Symposium on Networks-on-Chip (NOCS'07) 2007, 12 pages.
Ciordas et al., "Transaction Monitoring in Networks on Chip: The on-Chip Run-Time Perspective", Proceedings of the Symposium on Industrial Embedded Systems, 2006, 10 pages.
Ciordas et al., "An Event-Based Network-On-Chip Monitoring Service", ACM Transactions on Design Automation of Electronic Systems, 2005 pp. 149-154.
McKechnie, Paul E., et al., "Architectural Comparison of Instruments for Transaction Level Monitoring of FPGA-based Packet Processing Systems", 2009 17th IEEE Symposium of Field Programmable Custom Computing Machines, IEEE Computer Society, FCCM '09, Apr. 5-7, 2009, pp. 175-182, Napa, CA US.

* cited by examiner

*Primary Examiner* — Steven Snyder
(74) *Attorney, Agent, or Firm* — Kevin T. Cuenot

(57) ABSTRACT

A system for monitoring a device under test implemented within an integrated circuit (IC) can include at least one probe that detects a designated type of data transaction, where in response to detecting the designated type of data transaction, each probe outputs a single data transaction detection signal. The system also can include a data collector coupled to each probe, where the data collector stores an indication of each data transaction detection signal that is output by each probe. The data collector can be configured so that no value of any probed signal is stored.

17 Claims, 2 Drawing Sheets

LIGHTWEIGHT PROBE AND DATA COLLECTION WITHIN AN INTEGRATED CIRCUIT

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises pdf file(s), contains code that can be viewed using IBM-PC compatible machine running Microsoft Windows Operating System, and includes the below-listed files. All of the material disclosed in the Computer Program Listing Appendix can be found at the U.S. Patent and Trademark Office archives and is hereby incorporated by reference into the present application. The following notice applies to the code provided in the Appendix: © 2008 Xilinx Incorporated.

(1) Filename: Code for Lightweight Probe.txt. Creation Date: May 25, 2010. Size in Bytes: 2 KB.

(2) Filename: Code for Data Collector.txt. Creation Date: May 25, 2010. Size in Bytes: 5 KB.

FIELD OF THE INVENTION

The embodiments disclosed herein relate to integrated circuits (ICs). More particularly, one or more embodiments relate to monitoring operation of a circuit implemented within an IC using lightweight probes.

BACKGROUND

It is often useful to observe the internal signals of a circuit for purposes of debugging and/or verification. With respect to integrated circuits (ICs) such as, e.g., programmable ICs, one technique relies upon probes that are inserted into the physical implementation of the circuit within the programmable IC. Probes are implemented using the programmable logic elements of the programmable IC that are otherwise available for implementing the circuit to be probed, also referred to as the design under test (DUT). The probes can be instantiated within the DUT at user-selected locations.

Typically, each probe conveys a state or a value of a particular signal, e.g., the particular signal being probed, at a given clock cycle. This information can be provided to a logic analyzer. The logic analyzer can be instantiated within the programmable IC to operate cooperatively with the DUT. In this manner, signals of interest within the programmable IC can be collected by probes and routed to the "in-circuit" logic analyzer within the programmable IC for retention and subsequent analysis.

The probes and logic analyzer typically are programmable, general purpose components. This means that each probe may be configured to monitor any of a variety of different signals. The programmable nature of each probe, however, means that each probe requires a significant amount of circuit resources of the programmable IC to implement. Likewise, the logic analyzer will have a level of complexity and size commensurate with the programmability of the probes. This often limits a designer's ability to probe different portions of a DUT as the available resources on the programmable IC are simply insufficient to support the desired number of probes. This is particularly true with larger DUTs that require significant circuit resources of the programmable IC.

SUMMARY

One or more embodiments disclosed herein relate to monitoring the operation of a circuit or system referred to as a device under test (DUT) that is implemented within an integrated circuit (IC) using lightweight probes. One embodiment of the present invention can include a system for monitoring a DUT implemented within an IC. The system can include one or more probes that detect a designated type of data transaction. Responsive to detecting the designated type of data transaction, each probe can output a single data transaction detection signal. The system also can include a data collector coupled to each probe. The data collector can store an indication of each data transaction detection signal that is output by each probe. Further, the data collector does not store a value of any probed signal.

In one aspect, the data collector can include one counter for each probe. Accordingly, responsive to each data transaction detection signal, the data collector can increment a count of the counter corresponding to the probe that output the data transaction detection signal. The data collector can periodically output the count for each probe and, in response to outputting each count, reset each counter for each probe. The designated type of data transaction can be a transmission of a packet of data, a particular bus transaction, a processor interrupt, a memory access such as memory read or a memory write operation, or the like.

In another aspect, each probe can detect a same identifier disposed within a packet. The data collector can indicate movement of a selected packet that includes the identifier throughout the DUT by virtue of which counters within the data collector are incremented.

In still another aspect, the data collector can store a time stamp responsive to each data transaction detection signal received from each probe.

Another embodiment of the present invention can include a method of monitoring a DUT implemented within an IC. The method can include providing one or more probes that detect a designated type of data transaction. Responsive to detecting the selected type of data transaction, each probe can output a single data transaction detection signal. The method also can include providing a data collector coupled to each probe, wherein the data collector can store an indication of each data transaction detection signal that is output by each probe. Further, the data collector does not store a value of any probed signal.

In one aspect, the data collector can include one counter for each probe. Accordingly, the method can include, responsive to each data transaction detection signal, incrementing a count of the counter corresponding to the probe that output the data transaction detection signal. The method can include periodically outputting the count for each probe and resetting the counter for each probe responsive to the outputting. The designated type of data transaction can be selected to be a transmission of a packet of data, a particular bus transaction, a processor interrupt, a memory access such as memory read or a memory write operation, or the like.

In another aspect, each probe can detect a same identifier disposed within a packet. In that case, the method can include indicating movement of a selected packet that includes the identifier throughout the DUT by virtue of which counters within the data collector are incremented.

The method can include storing, within the data collector, a time stamp responsive to each data transaction detection signal received from each probe.

Yet another embodiment of the present invention can include a computer program product including a computer-usable medium having computer-usable program code that, when executed by a computer system, implements a system within an IC for monitoring a device under test also implemented within the IC. The computer-usable medium comprises computer-usable program code that implements at least one probe that detects a selected type of data transaction, where in response to detecting the selected type of data transaction, each probe outputs a single data transaction detection signal. The computer-usable program code also implements a data collector coupled to each probe, where the data collector stores an indication of each data transaction detection signal that is output by each probe, but where the data collector does not store a value of any probed signal.

The computer-usable program code that implements the data collector further includes computer-usable program code that implements one counter for each probe, where in response to each data transaction detection signal, the data collector increments a count of the counter corresponding to the probe that output the data transaction detection signal. The computer-usable medium further comprises computer-usable program code that causes the data collector to periodically output the count of each counter, and in response to the periodic outputting, resets each counter for each probe. In addition, the computer-usable medium comprises computer-usable program code that selects the designated type of data transaction to be a transmission of a packet of data. Moreover, the computer-usable medium comprises computer-usable program code that selects the designated type of data transaction to be a particular bus transaction. Further, the computer-usable medium comprises computer-usable program code that causes each probe to detect a same identifier disposed within a packet; and causes the data collector to indicate movement of a packet comprising the identifier throughout the device under test by virtue of which counters within the data collector are incremented.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

One or more embodiments disclosed within this specification relate to monitoring operation of a circuit design that is implemented within an integrated circuit (IC) such as, e.g., a programmable integrated circuit. In accordance with the inventive arrangements disclosed herein, one or more probes can be used to detect the occurrence of particular data transactions. Each probe can be implemented as a specialized, lightweight probe capable of detecting the occurrence of a selected type of high level event, referred to herein as a "data transaction." Each probe that detects such an event can output a data transaction detection signal to a data collector that is also disposed within the programmable IC.

Each probe can be coupled to the data collector. Rather than collecting values of signals of the circuit being monitored at different clock cycles, e.g., times, the data collector can collect statistical information relating to the different data transactions detected by the various probes. Accordingly, the data collector does not store a record of the actual signals that are exchanged within the circuit being monitored, but rather a record of the occurrence of particular data transactions that have occurred. The specialized, lightweight nature of the probes allows a designer to insert more probes into a circuit than would otherwise be the case were one to use more general-purpose and programmable probes and corresponding data collection mechanisms.

Figure 1:
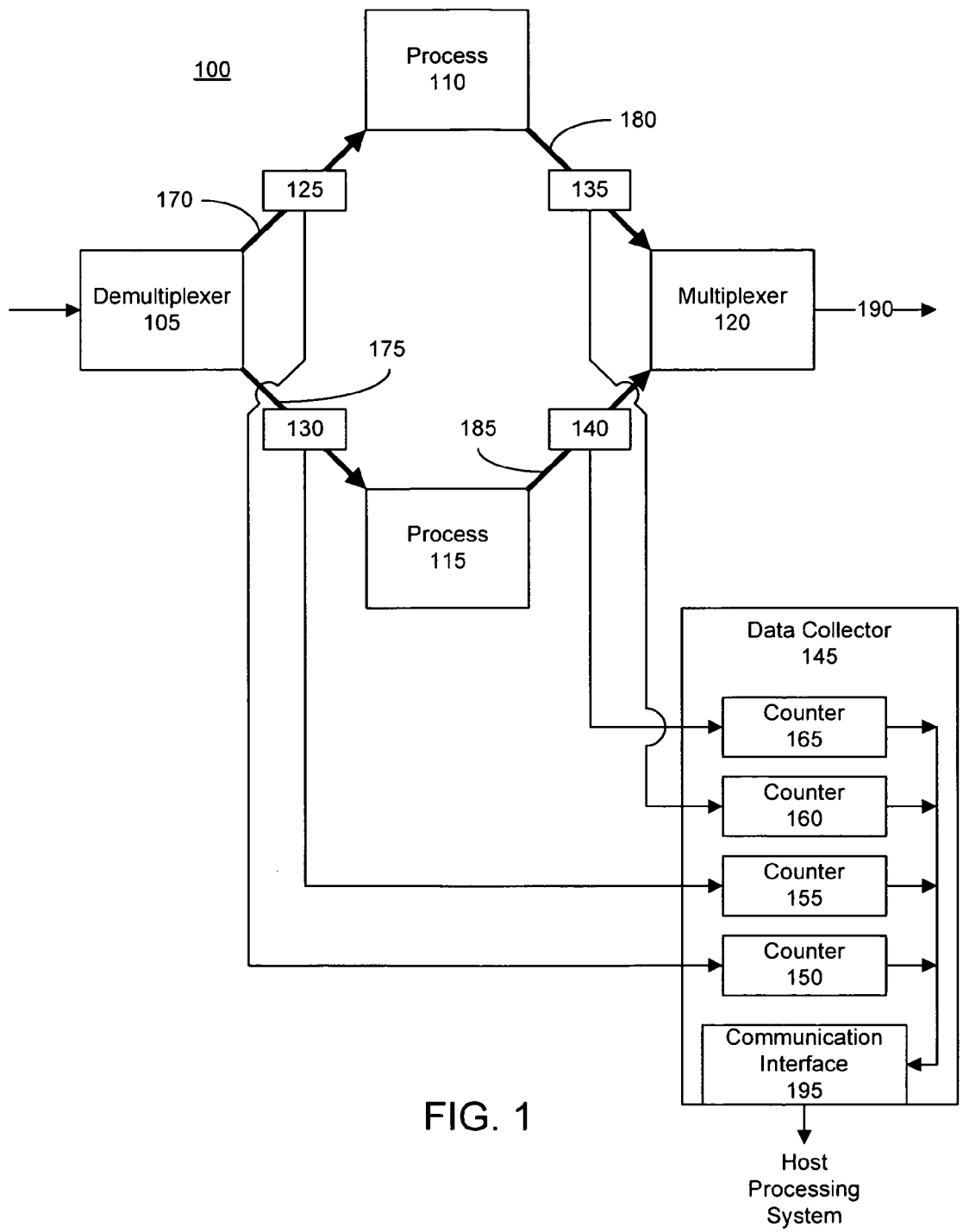
FIG. 1 is a block diagram illustrating a system for monitoring operation of a circuit implemented within an integrated circuit (IC) such as a programmable IC in accordance with one embodiment of the present invention.

FIG. 1 is a block diagram illustrating a system 100 for monitoring operation of a circuit design implemented within an IC such as a programmable IC in accordance with one embodiment of the present invention. Programmable ICs are a well-known type of integrated circuit that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

The circuit being monitored, also referred to as the device under test (DUT), can include a plurality of circuit modules 105, 110, 115, and 120. Circuit modules 105-120 can be coupled by data paths 170, 175, 180, and 185 as shown. Each of data paths 170-185 can represent one or more wires, or signals. Within this specification, the same reference characters are used to refer to terminals, signal lines, wires, and their corresponding signals. In this regard, the terms "signal," "wire," "connection," "terminal," and "pin" may be used interchangeably, from time-to-time, within this specification.

Each of data paths 170-185 can represent a plurality of signals that, when taken collectively and analyzed, can form a "data transaction." As used within this specification, a "data transaction" can refer to a high-level event that is a function of a plurality of signals that can be propagated serially and/or in parallel. Each data transaction can be defined by the occurrence of a predefined set of signals having a defined relationship with respect to one another over time. Examples of data transactions can include, but are not limited to, the transmission of a data packet or a particular type of data packet, the completion of a transaction or series of transactions on a bus, the transmission of a frame of data over Ethernet, interrupts generated to a processor, a memory access (a read or a write transaction), or the like.

System 100 can include a plurality of probes 125, 130, 135, and 140. A conventional probe can capture and output the value of a given individual signal or node of a circuit at a given clock cycle or time. Each of probes 125-140, however, can detect a data transaction and responsively output a signal indicating that the data transaction has been detected or occurred. Each of probes 125-140 can be specially configured to monitor a variety of different signals occurring over time to determine when a selected type of data transaction has occurred. In this regard, each of probes 125-140 can include logic that can evaluate the plurality of signals monitored by that probe in relation to one another over time to detect the occurrence of a larger, e.g., higher-level, event. In this example, probes 125-140 can be inserted into data paths 170-185 respectively. Each of probes 125-140 can be connected to a data collector 145, which also can be included within system 100, as shown.

Data collector 145 can be implemented as a finite state machine. In one embodiment, data collector 145 can be implemented in the form of a hard processor that is embedded within the programmable IC. In that case, the processor can execute suitable operational software causing the processor to perform the various functions described herein in relation to data collector 145. In another embodiment, data collector 145 can be implemented using the programmable fabric of the programmable IC, e.g., in the form of a "soft" processor. In that case, the soft processor can be configured using the programmable circuitry of the programmable IC to perform the functions described herein in relation to data collector 145.

As shown, data collector 145 can include a plurality of counters 150, 155, 160, and 165. In one embodiment, a one-to-one correspondence between probes 125-140 and counters 150-165 can exist. Each of counters 150-165 can be used to store a count that can be incremented responsive to a signal received from the probe that is connected to that counter. Each time a probe detects a data transaction, the probe can output a data transaction detection signal to data collector 145 which causes the count within the counter corresponding to the probe to be incremented.

Data collector 145 can include a communication interface 195, or port, through which data can be output. Through the communication interface 195, data, such as the contents of counters 150-165, can be sent "off-chip" to a host processing system or other computer system. The communication interface 195 can be implemented as any of a variety of different interfaces including, but not limited to, a universal asynchronous receiver/transmitter (UART), an Ethernet port, a Joint Test Action Group (JTAG) port, or some other type of interface. The contents of counters 150-165 can be sent periodically according to a selected timing interval. When the contents, e.g., the counts, of counters 150-165 are transferred off-chip, data collector 145 can reset or zero the count stored within each of counters 150-165 to begin counting detected data transactions for a new or next timing interval.

For purposes of illustration, consider the case where circuit module 105 of the DUT is a demultiplexer and circuit module 120 of the DUT is a multiplexer. Circuit modules 110 and 115 of the DUT can represent duplicate and independent processing blocks. For example, each of circuit modules 110 and 115 can represent a complex procedure that performs a calculation such as computing a checksum field for Internet Protocol (IP) packets transferred among the circuit modules of the DUT. Replicating circuit modules 110 and 115 allows throughput of the DUT to be increased by facilitating the processing of multiple packets simultaneously.

Within the DUT, demultiplexer 105 can make switching decisions based upon feedback received from circuit modules 110 and 115. Accordingly, demultiplexer 105 can output packets to either circuit module 110 or circuit module 115 based upon feedback signals received from circuit modules 110 and 115 respectively. Multiplexer 120 can schedule the resulting packets output from each of circuit modules 110 and 115 to generate and output a final packet data stream 190.

Using system 100, load balancing within the DUT can be measured over a period of time. For example, a circuit designer may wish to check the rate of packet input to each of circuit modules 110 and 115 to ensure that the demultiplexer 105 is evenly distributing packets to each of circuit modules 110 and 115. Also, the circuit designer may wish to check the rate of output from each of circuit modules 110 and 115.

In this example, each of probes 125-140 can be configured to detect a transmission of a packet. For example, each of probes 125-140 can be configured to detect a "start of frame"

signal and an "end of frame" signal to determine that a complete packet of data has been transmitted. Responsive to detection of a "start of frame" and "end of frame" signal pair, each probe can signal that a data transaction, e.g., a packet, has occurred or been detected.

As such, each of probes 125-140 can be inserted into the circuit to monitor packet flows among the different circuit modules of the DUT. As opposed to indicating each individual signal or signal value passing between circuit modules, each of probes 125-140 can be configured to output a data transaction detection signal only upon detecting transmission of a complete packet. Because each of probes 125-140 is configured to detect a particular data transaction at a known location within the DUT, each of probes 125-140 can output a single signal that indicates when a particular data transaction has been detected at that location.

Responsive to detecting the occurrence of the selected type of data transaction, the probe that detected the event can output a signal to data collector 145. The data transaction detection signal that is output by each of probes 125-140 does not convey the value of a probed signal or signals, but rather indicates only that a particular type of data transaction has occurred. Accordingly, within data collector 145, each of probes 125-140 can be coupled, via a single signal, to a respective one of counters 150-165. Counters 150-165 within data collector 145 can maintain statistical information relating to packet flow through the circuit.

Each of probes 125-140 can be specified, for example, using a hardware description language, and compiled to provide little or no programmability once inserted into the circuit. This means that to alter the type of data transaction that is to be detected by one or more or each of probes 125-140, the circuit design must be re-compiled and loaded into the programmable IC. Implemented in this manner, each of probes 125-140 and data collector 145 utilize fewer circuit resources of the programmable IC than their conventional programmable counterparts. A conventional programmable probe, while providing a high level of programmability, requires many more circuit resources and, therefore, is larger in size. The finite number of circuit resources available on a programmable IC means that fewer programmable probes can be inserted into a DUT than the probes described within this specification.

As noted, each of probes 125-140 can be configured to detect a particular type of event such as the transmission of a packet of data. Probe 125 can detect the transmission of a packet from demultiplexer 105 to process module 110. Responsive to detecting a packet of data, probe 125 can output a data transaction detection signal to data collector 145, which causes the count within counter 150 to be incremented. Similarly, probe 130 can detect the transmission of a packet from demultiplexer 105 to process module 115. Responsive to detecting a packet of data, probe 130 can output a data transaction detection signal to data collector 145, which causes the count within counter 155 to be incremented.

By the same token, probe 135 can detect the transmission of a packet from process module 110 to multiplexer 120. Responsive to detecting a packet of data, probe 135 can output a data transaction detection signal to data collector 145, which causes the count within counter 160 to be incremented. Probe 140 can detect the transmission of a packet from process module 115 to multiplexer 120. Responsive to detecting a packet of data, probe 140 can output a data transaction detection signal to data collector 145, which causes the count within counter 165 to be incremented.

By keeping a count of the different data transactions detected by each of probes 125-140 within counters 150-165, data collector 145 can maintain statistical information that specifies how effectively demultiplexer 105 performs load balancing between circuit module 110 and circuit module 115.

In this example, each of probes 125-140 is pre-configured and, therefore, known, to be monitoring for a selected type data transaction at a known location within the DUT. When a probe outputs a data transaction detection signal, the counter corresponding to that probe is incremented within data collector 145. No further information is needed to determine what has occurred since the purpose and location of each of probes 125-140 is known a priori and is unchanging. The same is true with regard to the counters 150-165. That is, when a count of a counter is incremented, the type of data transaction that is detected and the location within the DUT where the data transaction is detected is immediately known by virtue of which counter is incremented due to its correspondence with a single probe.

The counts stored within counters 150-165 can be output from data collector 145 to a host computer system through communication interface 195 on a periodic basis. The time interval over which counts from counters 150-165 can be output can be selected so that the counters 150-165 do not overflow or "flip" back to zero. The time interval over which data is uploaded from data collector 145 can be dependent upon the number of probes used to monitor the DUT and the upload speed or frequency with which data is sent from data collector 145 to the host computer.

System 100 allows one to monitor the operation of a DUT for as long as one may desire as data from the data collector 145 is output before data collector 145 becomes full, e.g., one of the counters 150-165 flips or overflows. When data is sent from data collector 145 to the host computer, the count stored within each of counters 150-165 can be reset to zero or otherwise initialized. Conventional probe systems typically continue to sample until the memory becomes full and then stop.

While the probes described with reference to FIG. 1 can detect the start and the end of packets, it should be appreciated that each probe can be configured to detect any portion of a packet or particular identifiers within a packet. For example, in another embodiment, each probe can be configured to detect a particular field or identifier (ID) of a packet and output a data transaction detection signal responsive to detecting a packet with a particular ID. By placing a plurality of such probes, each being configured to detect packets having a same ID, throughout the DUT, the progress of a particular packet, as that packet propagates through the DUT, can be monitored and tracked. When the selected packet passes a given probe, that probe will output a data transaction detection signal. The counters maintained within the data collector 145 indicate the path of the packet through the DUT as each counter corresponds to a particular probe and, therefore location, within the DUT. The path of the packet can be tracked by virtue of which counters are incremented during each timing interval over which the DUT is monitored.

FIG. 1 has been described largely in the context of a packet processing system. The use of packets as examples of data transactions, however, was for purposes of illustration only. One or more embodiments can be applied to other types of data transactions such as bus transactions or the like where complex or interrelated signals are to be processed to indicate some higher level functionality. In another embodiment, for example, the particular data transactions that are monitored within the DUT can be correlated to particular software events within a computer system. In this manner, system 100 can detect and/or monitor higher level software functions of a DUT.

In another embodiment, each probe can be configured to count the number of data transactions that occur over a given period of time. In such an embodiment, each probe can track time or clock cycles. At the expiration of the timing interval, each probe can output a value indicating a number of data transactions detected by that probe over the time interval. The data collector can store the number of data transactions detected by each probe on a per timing interval basis.

In still another embodiment, system 100 can be modified to facilitate time-based replay of the data transactions that are detected. For example, each probe can be modified to track clock cycles and output a time stamp indicating when each data transaction is detected. The time stamp can be output to the data collector and stored therein. In such an embodiment, the data collector can include additional memory or registers to record the various time stamps received in addition to the count for each probe, so that a timeline of data transactions from each respective probe can be reconstructed. In an alternative embodiment, the data collector can be modified to mark the time when each probe outputs a data transaction detection signal rather than receiving time stamp information from the probes.

When time stamp data is received and/or stored in addition to count data, it should be appreciated that the time stamp data can be output from communication interface 195 to the host processing system in addition to, or in combination with, the count data. This allows the timeline of data transactions to be reconstructed within the host processing system.

In another embodiment, the use of time stamps for each detected data transaction can be used in place of keeping a count. More particularly, when a time stamp is stored for each data transaction detection signal from each probe, a counter or explicit count need not be kept. A count can be reconstructed from counting each of the time stamps stored for each respective probe. In such an embodiment, each time stamp can include an identifier that correlates with a particular probe. Alternatively, separate memories, or separate partitions of memory, can be maintained where each memory (or partition) corresponds to one probe. This allows the time stamp data from each respective probe to be maintained independently without co-mingling in order to reconstruct a timeline of the various data transactions detected throughout the system on a per probe basis. As noted, in such an embodiment, the data collector 145 can include a plurality of different memories as opposed to, or in addition to, counters 150-165.

In any case, it should be appreciated that each probe and the data collector can be highly specialized for a particular purpose. The particular implementation of each probe and the data collector will, therefore, depend upon the type of protocol or transactions being monitored and the type of statistical data that is to be collected. Further, the number of probes included is not intended to be a limitation of the present invention. For example, four probes were shown to illustrate an example of the way in which data transaction level probes can be used to monitor different types of statistical information and the movement of data transactions within the DUT. Fewer than four or more than four probes may be used.

An Appendix follows which includes a portion of Verilog hardware description language code illustrating an example of a lightweight probe for monitoring and interpreting a LocalLink packet transfer. In general, LocalLink is a high-performance, synchronous, point-to-point interface promulgated by Xilinx, Inc. of San Jose, Calif., that is designed to serve as the user interface to system interconnect solutions. The interface defines a set of protocol transparent signals that allows for the transfer of generic packets. The Appendix also includes a portion of Verilog hardware description language code illustrating an example of a data collector as described within this specification. The data collector illustrated in the Appendix includes a plurality of counters, though no communication interface is included for ease of illustration.

Figure 2:
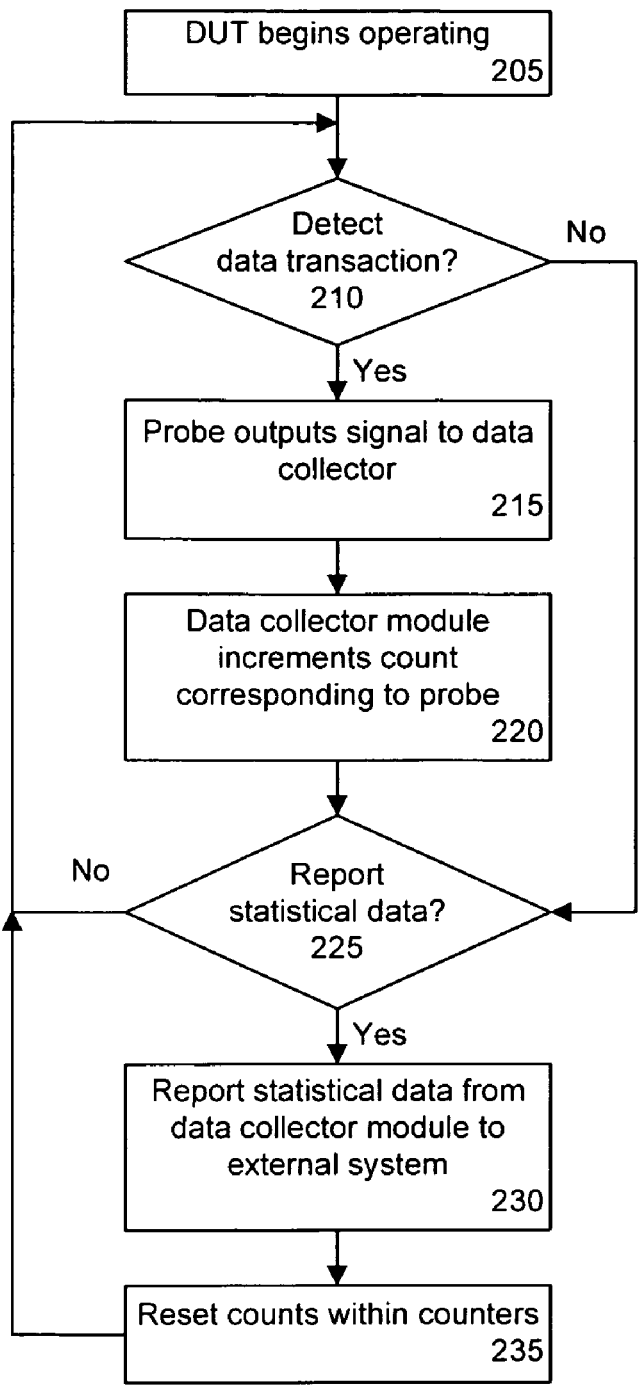
FIG. 2 is a flow chart illustrating a method of monitoring operation of a circuit implemented within an IC such as a programmable IC in accordance with another embodiment of the present invention.

FIG. 2 is a flow chart illustrating a method of monitoring operation of a circuit that is implemented within an IC such as a programmable IC in accordance with another embodiment of the present invention. Method 200 can be performed by a system as described with reference to FIG. 1. Accordingly, method 200 can begin in a state where one or more specialized, lightweight probes have been compiled and instantiated within a DUT within a programmable IC. Each probe can be configured to detect the occurrence of a particular event, e.g., data transaction.

Accordingly, in step 205, the DUT within which probes have been inserted can begin to operate. In step 210, a determination can be made as to whether a data transaction has been detected. When a probe detects a data transaction for which that probe has been configured to detect, the probe can output a data transaction detection signal, in step 215, to the data collector. In step 220, the data collector can increment the count of the counter that corresponds to the probe that output the data transaction detection signal in step 215.

In step 225, the data collector can determine whether to report the statistical data that has been collected within the counters as well as any timing information that may also have been collected. The data collector can report statistical data, e.g., the contents of the counters, periodically. If the data collector determines that it is time to report statistical data, method 200 can continue to step 230. Otherwise, method 200 can loop back to step 210 to continue processing.

In step 230, the data collector can output the statistical data, e.g., each stored count, to an external system, e.g., a system that is located "off-chip." In step 235, the data collector can reset the count stored within each of the counters to begin counting the occurrence of detected data transactions for a new timing interval.

One or more embodiments disclosed within this specification provide a system of specialized, lightweight probes that can be used to monitor for the occurrence of data transactions and/or to track the progress of data transactions throughout a probed DUT. The lightweight nature of the probes, in general, trades programmability for reduced size of the resulting implementation in terms of both the probes and the data collector. One result of trading programmability for reduced size is that the DUT must be recompiled and/or resynthesized if the type of transactions to be detected, the placement of probes, etc. is to be changed. This results in a smaller, more specialized probe that requires fewer resources of the programmable IC and, therefore, can be used more freely within a given DUT.

In addition, the use of mechanisms to count detected data transactions results in less information being accumulated within the data collector as compared to conventional probe systems. As a result, one or more embodiments disclosed within this specification require less data to be uploaded from the DUT to an off-chip analysis system. This is a consequence of detecting data transactions as opposed to recording signal values. In any case, sending a data set of reduced size from the DUT to a location off-chip requires less bandwidth and can be used in cases where probing is desired despite the availability of only low upload data rates from the DUT to the off-chip analysis system.

It should be appreciated that one or more embodiments of the present invention can be embedded in a computer program product, which comprises all the features enabling the implementation of the methods and systems described herein. The computer program product can include a computer-usable or computer-readable medium having computer-usable program code which, when loaded within, and executed by, a computer system, causes the computer system to perform the functions described herein or instantiate a system as described herein within a programmable IC. Examples of computer-usable or computer-readable media can include, but are not limited to, optical media, magnetic media, magneto-optical media, computer memory such as random access memory or hard disk(s), or the like.

For example, one embodiment of the present invention can include a computer program product having stored thereon computer-usable program code specifying an intellectual property (IP) care. An IP core, or "core," refers to a pre-designed, programmatic description of hardware that performs a particular function. The IP core can be specified as a hardware description language file or files, as a bitstream that programs a programmable IC, whether fully or partially programmable, as a netlist, or the like. Alternatively, an IP core can include source code or schematics that describe the logic and connectivity of a portion of a circuit design. Typical IP cores can provide, but are not limited to, digital signal processing (DSP) functions, memories, storage elements, math functions, etc. Some IP cores include an optimally floor-planned layout targeted to a specific family of ICs. Cores can also be parameterizable in that the user may enter parameters to activate or change certain functionality of the IP core.

A "computer," e.g., a data processing system or a computer system, suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices such as, for example, keyboards, displays, pointing devices, etc., can be coupled to the computer either directly or through intervening I/O controllers. Network adapters may also be coupled to the computer to enable the computer to become coupled to other computers, devices, or remote printers or storage devices through intervening private or public networks. Modems, cable modems, and Ethernet cards are just a few of the currently available types of network adapters.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; and/or b) reproduction in a different material form. For example, a computer program can include, but is not limited to, a subroutine, a function, a procedure, an object method, an object implementation, an executable application, an applet, a serviette, a source code, an object code, a shared library/dynamic load library, a circuit description, and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open-ended language. The term "coupled," as used herein, is defined as connected, although not necessarily directly, and not necessarily mechanically, e.g., communicatively linked through a communication channel or pathway or another component or system.

One or more embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A system for monitoring a device under test implemented within an integrated circuit (IC), the system comprising:
   a plurality of probes, wherein each probe is configured to detect a designated type of data transaction, wherein responsive to detecting the designated type of data transaction, each probe outputs a single data transaction detection signal; and
   a data collector coupled to each probe, wherein the data collector stores an indication of each data transaction detection signal that is output by each probe,
   wherein the data collector comprises a plurality of counters, wherein each counter is associated with one of the plurality of probes, wherein responsive to each data transaction detection signal from a probe, the data collector increments a count of the counter corresponding to the probe that output the data transaction detection signal,
   wherein a value of any probed signal is not stored.

2. The system of claim 1, wherein the data collector periodically outputs the count for each probe and, in response to outputting each count, resets each counter for each probe.

3. The system of claim 1, wherein the designated type of data transaction is a transmission of a packet of data.

4. The system of claim 1, wherein the designated type of data transaction is a particular bus transaction.

5. The system of claim 1, wherein the designated type of data transaction is a processor interrupt.

6. The system of claim 1, wherein the designated type of data transaction is a memory access.

7. The system of claim 1, wherein each probe detects a same identifier disposed within a packet, wherein the data collector indicates movement of a selected packet comprising the identifier throughout the device under test by virtue of which counters within the data collector are incremented.

8. The system of claim 1, wherein the data collector stores a time stamp responsive to each data transaction detection signal received from each probe.

9. A method of monitoring a device under test implemented within an integrated circuit (IC), the method comprising:
   providing a plurality of probes, wherein each probe is configured to detect a designated type of data transaction, wherein responsive to detecting the selected type of data transaction, each probe outputs a single data transaction detection signal; and
   providing a data collector coupled to each probe, wherein the data collector stores an indication of each data transaction detection signal that is output by each probe,
   wherein the data collector comprises a plurality of counters, wherein each counter is associated with one of the plurality of probes, wherein responsive to each data transaction detection signal from a probe, the data collector increments a count of the counter corresponding to the probe that output the data transaction detection signal, wherein a value of any probed signal is not stored.

10. The method of claim 9, further comprising:
periodically outputting the count for each probe; and
resetting the counter for each probe responsive to the outputting.

11. The method of claim 9, wherein each probe detects a same identifier disposed within a packet, the method further comprising indicating movement of a selected packet comprising the identifier throughout the device under test by virtue of which counters within the data collector are incremented.

12. The method of claim 9, further comprising storing, within the data collector, a time stamp responsive to each data transaction detection signal received from each probe.

13. A computer program product comprising:
a non-transitory computer-usable medium comprising computer-usable program code that, when executed by a computer, implements a system within an integrated circuit (IC) for monitoring a device under test also implemented within the IC, the computer-usable medium comprising:
computer-usable program code that implements a plurality of probes, wherein each probe is configured to detect a selected type of data transaction, wherein responsive to detecting the selected type of data transaction, each probe outputs a single data transaction detection signal; and
computer-usable program code that implements a data collector coupled to each probe, wherein the data collector stores an indication of each data transaction detection signal that is output by each probe,
wherein the computer-usable program code that implements the data collector further comprises computer-usable program code that implements a plurality of counters, wherein each counter is associated with one of the plurality of probes, wherein responsive to each data transaction detection signal from a probe, the data collector increments a count of the counter corresponding to the probe that output the data transaction detection signal, wherein a value of any probed signal is not stored.

14. The computer program product of claim 13, wherein the computer-usable medium comprises computer-usable program code that causes the data collector to periodically output the count of each counter and, responsive to outputting, reset each counter for each probe.

15. The computer program product of claim 13, wherein the computer-usable medium comprises computer-usable program code that selects the designated type of data transaction to be a transmission of a packet of data.

16. The computer program product of claim 13, wherein the computer-usable medium comprises computer-usable program code that selects the designated type of data transaction to be a particular bus transaction.

17. The computer program product of claim 13, wherein the computer-usable medium comprises:
computer-usable program code that causes each probe to detect a same identifier disposed within a packet; and
computer-usable program code that causes the data collector to indicate movement of a packet comprising the identifier throughout the device under test by virtue of which counters within the data collector are incremented.

* * * * *